Figure 1:
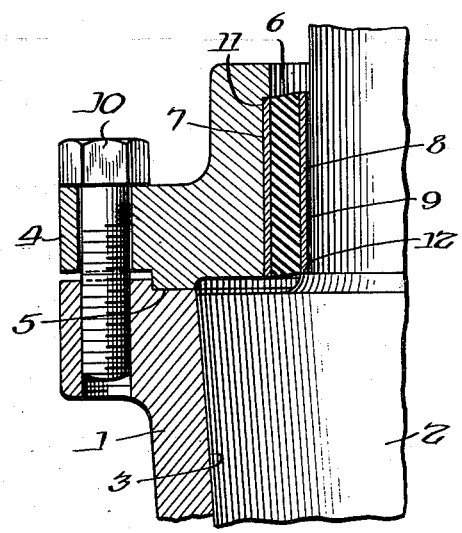

Dec. 5, 1950   E. G. SCHMIDT   2,533,183
RESILIENT MOUNTING

Filed Dec. 21, 1944   2 Sheets-Sheet 1

Inventor:
Edward G. Schmidt
By: Joseph O. Lange Atty.

Dec. 5, 1950     E. G. SCHMIDT     2,533,183
RESILIENT MOUNTING
Filed Dec. 21, 1944     2 Sheets-Sheet 2
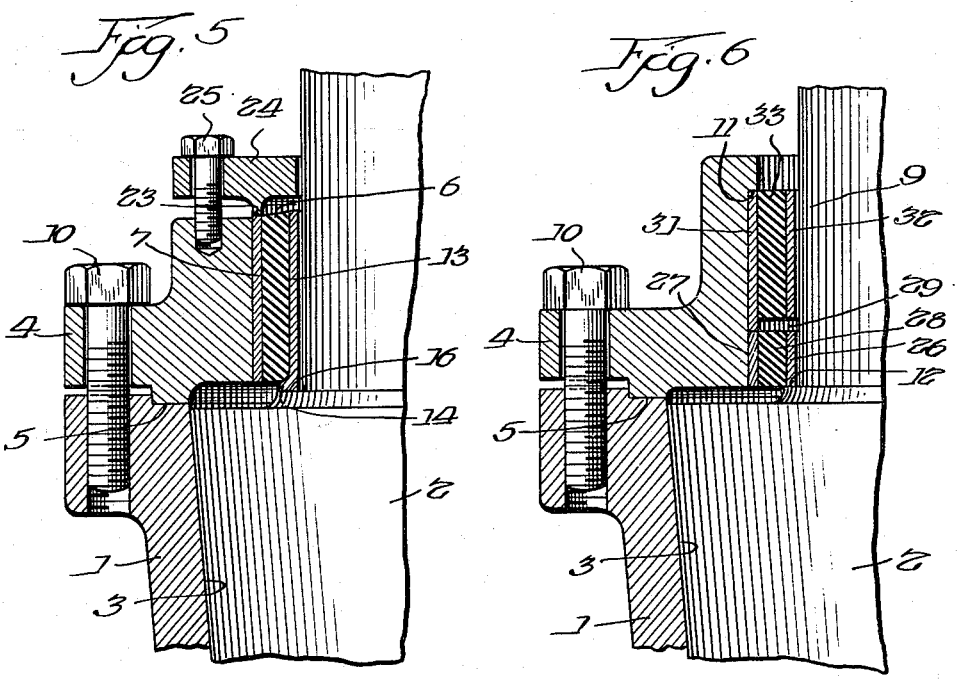
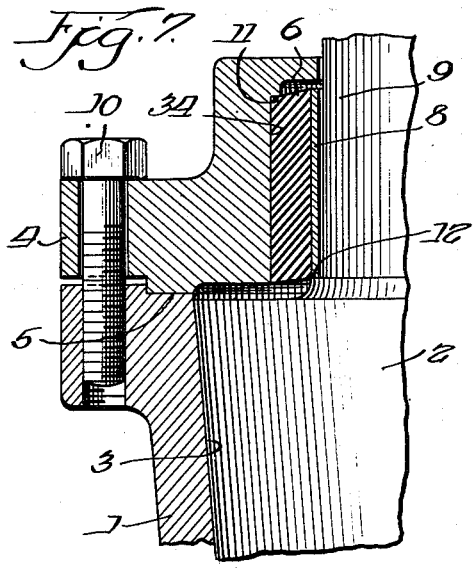
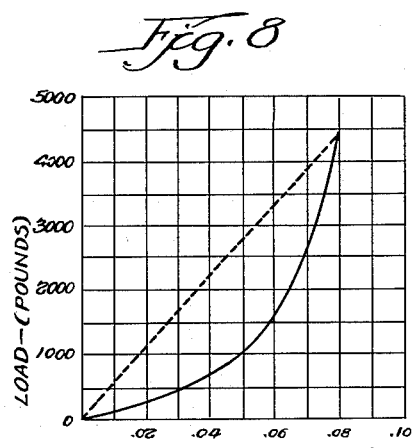
Inventor:
Edward G. Schmidt
By: Joseph O. Lange, Atty.

Patented Dec. 5, 1950

2,533,183

UNITED STATES PATENT OFFICE 2,533,183

RESILIENT MOUNTING

Edward G. Schmidt, Western Springs, Ill., assignor to Crane Co., Chicago, Ill., a corporation of Illinois Application December 21, 1944, Serial No. 569,221

4 Claims. (Cl. 251—97)

This invention relates to a resilient mounting for valves or the like. More particularly, it pertains to a mounting useful in sealing an end portion of a relatively movable member having endwise or longitudinal movement influenced either by internal pressures or other factors.

In lubricated rotary plug valves of the well known types, trouble has heretofore been encountered because of the sticking of the plug or closure member in the body after the valve has been allowed to stand for a period of time without operation and without lubrication or perhaps due to a mild corrosive attack or a combination of both. To overcome such objectionable sticking it has been the practice in connection with prior valves to provide a resilient mounting above the plug to hold the latter member to its seat with sufficient end thrust to secure tightness and yet at the same time to permit the plug or closure member to be lifted or jacked from its frusto-conical seat by hydraulic force created by the insertion of lubricant under high pressure into the valve or by the line pressure itself. Many and sundry methods have been used for the purpose of providing a resilient mounting and in these valves such devices as metallic diaphragms, gaskets, thrust washers, stuffing box packing and glands have been tried in an effort to obtain a satisfactory construction.

However, all of these prior structures have had the handicap of involving a relatively complicated structure and, in addition, have been expensive and in many cases required repeated adjustment to compensate for wear and replacement of the several parts.

One of the important objects therefore of this invention is to provide a simple and relatively more economical construction capable of performing the function equally as well or better.

Another important object is to provide a resilient mounting in which rubber or other resilient materials are suitably positioned so as to be placed in shear relation during normal operation.

Another important object is to provide a rubber sleeve mounting permitting shear movement of the rubber, in which in a preferred form the latter is encased as a sleeve between telescopically arranged metal cylinders capable of being positioned between the plug shank and the bonnet or cap of the valve, whereby when the latter member is attached to make a joint with the body, the rubber or other resilient material which can be employed may be placed in shear at the same time.

Another object is to provide a construction in which by suitable selection of dimensions for the plug, cap and sleeve and by control of the physical properties of the rubber or rubber-like material selected, the thrust on the valve plug can be suitably adjusted to the end load most desirable considering the pressures at which the valve is designed to operate.

Another important object is to provide a resilient mounting which permits, if sticking of the plug occurs, hydraulic force to be applied to jack the plug from its seat against the resilient thrust of the sleeve in shear, the thrust of the latter member acting essentially as a spring and thereby compensating for the changes in thickness of the lubricant film applied between the plug and the valve seat. The resilient mounting is thus capable of forcing the plug back to the desired relationship with the seat of the valve casing.

Another object is to provide in a novel construction of resilient mounting, convenient adjusting means permitting the variation of the thrust on the plug to meet service requirements.

A further object is to provide a structure which permits rotation as well as longitudinal movement of the closure member or plug.

Other objects and advantages of my novel resilient mounting will become more readily apparent in proceeding with the following specification read in light of the accompanying drawings, in which Fig. 1 is a fragmentary sectional view showing a relatively simple embodiment of my invention applied to a lubricated plug valve.

Figs. 2 to 7 inclusive show modified forms applied similarly and embodying the principle of the invention.

Fig. 8 is a view showing comparative load deflection curves with mountings illustrative of this invention.

Similar reference characters apply to similar parts throughout the several views.

Referring now to Fig. 1, a plug valve body or casing 1 is fragmentarily shown having a frusto-conical plug or closure member 2 seated on a similar bearing face 3 of the valve body 1. Between the plug 2 and the bearing surface 3 a film of lubricant under pressure is normally applied by suitable means (not shown) to aid in the easy rotation of the plug as well as to serve as a sealing medium in guarding against leakage around the plug bearing. At the outset, it should be appreciated that by the latter introduction of the lubricant under relatively high pressure, there occurs a slight upward movement or jacking of the plug, the lubricant tending to displace the plug relative to the casing. Above the valve body 1 and held thereto by suitable bolting means 10 is the cap or bonnet 4, forming a sealed joint with the body 1, as at 5. Obviously at the latter location a gasket may be interposed, if desired, depending upon the service and the type of finish of the abutting surfaces. Before such latter assembly is made and after the plug has been suitably positioned in the body, the rubber sleeve 6 is snugly encased in two telescopically arranged cylinders, which may be of a suitable metal or other material, the outer cylinder being designated 7 and the inner cylinder 8. The outer cylinder 7 is preferably press-fitted into the cap 4 while the inner cylinder 8 is maintained with a running fit on the plug shank 9.

It should be understood that an alternate construction can be provided in which a press fit is maintained between the plug shank 9 and the inner cylinder 8 while a running fit is maintained between the outer cylinder 7 and the cap 4, which alternate construction is merely a matter of choice depending upon the valve construction. The cap 4 is suitably bolted to the body to make the joint at 5 as previously described, and at the same time the combined resilient mounting with the cylinders 7 and 8 and the rubber 6 permits shear deflection as shown. The outer cylinder 7 shoulders annularly at the overhanging projecting portion 11 on the cap 4, while the inner cylinder 8 shoulders similarly on the underlying annular projection 12 at the lower portion of the plug shank 9. It is thus apparent that by suitable arrangement and selection of the resilient member 6, i. e. proper loading, the end thrust on the plug can easily be adjusted to such downwardly applied retaining load which is most suitable for the pressure and line condition at which the valve is intended to operate. At the same time a pressure-tight seal between the plug upper chamber and the atmosphere is maintained. If desired, the rubber or other resilient material 6 may not only be press-fitted between the respective outer and inner cylinders 7 and 8 but it may be suitably bonded therebetween, thus making it convenient to apply longitudinal forces to the metal cylinders and to transmit these forces to the rubber to produce the desired shear deflection. The respective annular shoulders 11 and 12, and the peripheral surfaces of the cylinders 7 and 8 are suitably finished so as to provide for leakproof or sealing relationship therebetween in order to bear the concentration of stress at the corners thus provided.

It should be apparent that if the plug sticks to its seat during the course of service and it becomes necessary to apply lubricant to the bearing surface 3 in order to jack the plug from its seat, the thrust of the rubber sleeve 6 now in its shear deflection acts essentially as a spring to oppose the lift of the plug to compensate for the change in thickness of the lubricant film between the plug and the seat. Thus it will tend to force the plug back to its normal or desired contact relative to the valve seat. It should be clear, of course, that depending upon the pressure conditions encountered, the amount of end thrust of the plug to be resisted and the shear deflection desired, the thickness of the rubber sleeve 6 may be varied to suit. This applies also to the thickness of the inner and outer cylinders and the respective shoulder portions of the cap and plug with which they cooperate.

Referring now to the modified form in Fig. 2, the construction is similar in all respects to that described in connection with Fig. 1, except the inner metal cylinder 13 is provided with a lower depending flange 14 joined to the lower portion of the cylinder 13 by a suitable fillet or radius 15. Such construction serves a significant and very important function for, as shown more clearly in Fig. 8, a desirable load deflection curve may be obtained differing from the straight line (dotted) for that construction covered in Fig. 1. In many instances the straight line load deflection may not be desirable inasmuch as tightening of the bonnet flange 4 in making a pressure-tight joint 5 may cause too great a variation in loading of the plug in view of the deflection of the mounting which occurs during this operation. Under such circumstances it is preferable to have a loading of the plug as illustrated by the curve shown in solid line in Fig. 8. In further explanation of the latter's advantages, the load on the plug will increase relatively slowly as the initial shear deflection of the rubber takes place during the tightening operation referred to, for the reason that the radius 15 is shown at the lower juncture of the flanged sleeve permits considerable deflection of the resilient mounting initially without too much load being applied to the plug. However, as the load is increased and the deflection increases, more of the rubber is placed in shear and with further increase in the thrust load the rate of deflection decreases. The shoulder of the plug to accommodate the flange 14, as indicated at 16, may be of broader width in order to accommodate the flange.

Figure 2:
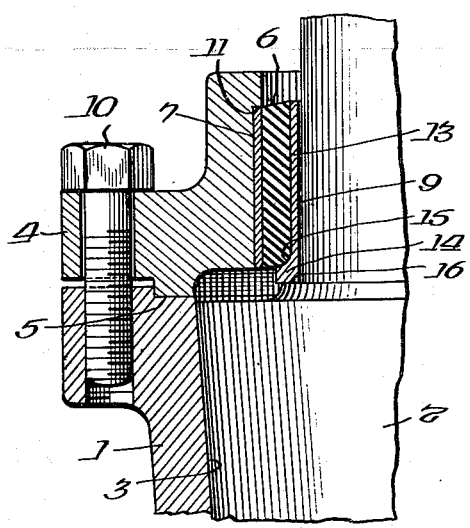
Figure 3:
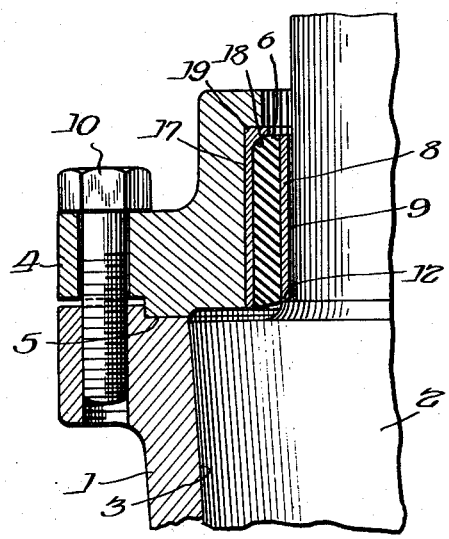

Referring now to a further modification, and as shown in Fig. 3, instead of having the flange portion on the inner cylinder 8, the filleted flange 18 may be provided at the upper portion of the outer cylinder 17 to bear against the under shoulder 19. As mentioned in connection with the load deflection curve of Fig. 8, described in reference to Fig. 2, the same loading advantages are applicable in the construction just described in Fig. 3. The constructions of both Figs. 2 and 3 possess the additional advantages that only a small deflection is allowed as the load is increased, for example, from 1500 to 4500 pounds. This small deflection within the range of 1500 to 4500 pounds permits an increase in lubricant pressure in the valve body 1 to a pressure which exceeds the line pressure before the plug 2 is lifted sufficiently to permit the inserted lubricant to be forced out from between the seating surfaces at 3.

Figure 4:
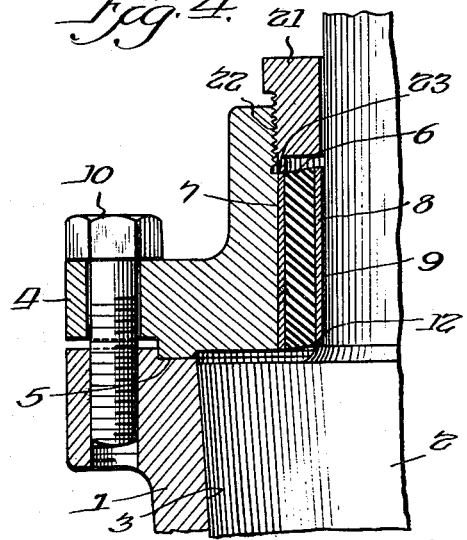

Fig. 4 is a variation of Fig. 1, and provides for either increasing or decreasing the deflection of the mounting and the load on the plug to suit service conditions by adjustable means. In this construction the outer ring 7, instead of being press-fitted into the bonnet 4 as is applicable to Fig. 1, has a sliding fit provided therebetween in order that the gland 21 having the threads 22 engaging similar threads in the bonnet 4 may be used to bear against the outer cylinder 7 and thus drive the latter member downward so as to place the rubber sleeve member 6 in desired shear deflection. The gland 21 engages the upper peripheral surface of the outer cylinder 7 preferably by means of the depending annular portion 23. Line leakage occurring past the slidable fit between the cylindrical member 7 and the bonnet 4 is overcome by the employment of a lubricant seal which may be applied therebetween. Thus the latter construction providing for both rotational and longitudinal movement of the resilient mounting may be used in place of the press fit described in connection with Fig. 1.

Fig. 5 is similarly a modified form of Fig. 2, in which adjustable means are supplied to the outer cylinder 7, and the foregoing explanation with respect to the sliding fit between the outside diameter of the member 7 and the bore of the bonnet 4 applies. While a bolted gland 24 is illustrated in this figure, using the bolts 25, the method of tightening the gland may of course be similar to that shown in connection with Fig. 4, that is, employing the threads 22 instead of the bolts 25. The method of contacting the outer cylinder 7 as at 23 is similar to that described in connection with Fig. 4.

In Fig. 6 a further modified form of resilient mounting is shown in which two sleeves are employed in superposed relation. While two sleeves are shown, it will be apparent that more may be used, if desired. In this construction, the lower resilient mounting consists of the inner and outer relatively short cylinders 26 and 27 respectively, with the rubber sleeve 28 snugly fitted therebetween. Above the latter resilient mounting the space or chamber 29 is provided created by the fact that the lower outer cylinder 27 supports the outer cylinder 31 having a lower annular extended portion as indicated. The upper resilient mounting is similarly provided with an inner cylinder 32, having fitted therebetween the rubber sleeve 33. The respective lengths, proportions and materials of the sleeves 28 and 33 may of course vary from the proportions disclosed. Thus the lower inner cylinder is supported upon the annular shoulder 12 of the plug 2, while the upper outer cylinder 31 bears against the shoulder 11 and at its lower portion against the annular top portion of the cylinder 27. Thus by employing two or more resilient mountings in the combination shown in this figure unusual functional flexibility has been obtained. For example, the material of the rubber sleeve 28 may be such as to permit a high deflection rate, or vice versa, for a small increase in plug loading of the order of zero to 1000 pounds, for example, referring to the solid line curve shown on the load deflection chart in Fig. 8, and when the initial deflection has been taken up, the upper mounting will contact the lower mounting and more rubber will be placed in shear and the load deflection rate then should be somewhat similar to that shown for that portion of the solid line curve in Fig. 8 from 1000 to 4500 pounds. It should be apparent from this arrangement that considerable flexibility is obtained in the performance of this device on a variety of service pressures. It should also be understood that the adjustability referred to in Figs. 4 and 5 may be conveniently employed, if desired, and this also applies to the inner and outer flange arrangements referred to in Figs. 2 and 3.

It is clear from what has been said that under certain conditions of installation, the outer cylinder 7 might be eliminated and, as shown in Fig. 7, this is easily obtained by having the rubber sleeve 6 press-fitted or bonded directly to the bonnet member 4, as indicated at 34. In this case the rubber sleeve 6 in slight shear deflection shoulders directly against the inner annular projection 11 of the bonnet member 4, while the inner cylinder 8 is mounted similar to the manner described in connection with Fig. 1, shouldering against the annular ledge 12 of the plug 2.

It will be clear in all of the above constructions that the inner cylinders 8, 13, 26 and 32 preferably have clearances whereby the plug is permitted to be rotated relative to the resilient member. Similar results are obtainable however if clearances are provided between the outer liners or cylinders 7, 17, 27 and 31 and the bonnet 4, while a press fit is maintained around the plug shank 9.

It should be clear from the foregoing description that my invention is capable of application to a wide variety of devices other than the plug valve described, as for example those broadly in which there is relative longitudinal movement between members and in which it is desirable to maintain an annular seal therebetween at all times, the compression load varying directly with the thrust created by either the lubricant pressure, line pressure or other forms of internal pressure within a pressure vessel. Thus it is the desire not to be limited specifically to the application described as a product but to a variety of devices and that the claims be limited only as determined by the state of the art.

I claim:

1. In a resilient mounting, the combination including a casing, a longitudinally movable member seated within the said casing, a cap therefor, a resilient member including a rubber-like material interposed between said cap and said longitudinally movable member, the said resilient member being mounted for shear deflection and bearing against annular shoulder portions oppositely disposed on the said cap and movable member, the said resilient member comprising tubular means in telescopic relation and with relieved ends for frictionally supporting said rubber-like material against substantial axial movement.

2. Sealing means for a plug valve or the like, the combination including a casing, a longitudinally movable member seated within the said casing, a cap therefor, a resilient member comprising rubber or like material interposed between said cap and said longitudinally movable member, the said resilient member bearing against annular corner portions oppositely disposed on said movable member and said cap, the said resilient member including inner and outer cylinder means for retaining said rubber on like material therebetween for shear deflection of the rubber or like material, the said cylinder means having end shoulder means cooperating with the annular corner portions whereby a varying shear deflection rate is obtained as the load on the said resilient member is increased, the annular corner portions of the said movable member and cap positively inhibiting axial movement of said inner and outer cylinder means in the same direction upon unseating of the movable member.

3. In a shear deflectable resilient mounting, the combination including a casing, a longitudinally movable member seated within the said casing, a cap therefor, a substantially hollow cylindrical resilient member including at least one rigid cylinder therearound interposed between said cap and said longitudinally movable member, the said resilient member and rigid cylinder bearing against annular shoulder portions oppositely disposed in different planes, the said resilient cylindrical member being held against axial movement on at least one of its peripheries.

4. In a resilient mounting, the combination including a casing, a longitudinally movable member seated within the said casing, means mounted to retain the said movable member, a resilient member annularly positioned between said retaining means and said longitudinally movable member, the said resilient member bearing at its upper and lower end portions against annular corners oppositely disposed, inner and outer cylinders in telescoped relation, the said resilient member being interposed therebetween and being substantially unconfined at its upper and lower end portions, at least one of the said cylinders being held against longitudinal movement relative to the other.

EDWARD G. SCHMIDT.

REFERENCES CITED

The following references are of record in the file of this patent:

UNITED STATES PATENTS

| Number | Name | Date |
|---|---|---|
| 1,562,195 | Scheneck | Nov. 17, 1925 |
| 1,575,356 | Mills | Mar. 2, 1926 |
| 1,800,552 | Martin | Apr. 14, 1931 |
| 1,933,085 | Barchard | Oct. 31, 1933 |
| 2,012,427 | Haun | Aug. 27, 1935 |
| 2,014,463 | Bard | Sept. 17, 1935 |
| 2,110,098 | Strecker | Mar. 1, 1938 |
| 2,229,120 | Nordstrom | Jan. 21, 1941 |
| 2,365,752 | Edwards | Dec. 26, 1944 |
| 2,381,423 | Buck | Aug. 7, 1945 |